United States Patent
Hung et al.

(10) Patent No.: US 6,422,719 B1
(45) Date of Patent: Jul. 23, 2002

(54) HEAT SOURCE SHIELDING DEVICE OF PROJECTING APPARATUS

(75) Inventors: Tech Hung; Nien Hui Hsu; Shun Chi Lee, all of Hsin Chu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 09/685,981

(22) Filed: Oct. 10, 2000

(51) Int. Cl.[7] .............................................. F21V 29/00
(52) U.S. Cl. ....................... 362/373; 362/580; 362/294; 362/268; 362/345
(58) Field of Search ................................. 362/580, 294, 362/345, 264, 373, 268

(56) References Cited

U.S. PATENT DOCUMENTS 4,349,078 A * 9/1982 Shimada et al. ........... 180/69.1
5,420,769 A * 5/1995 Ahlgren et al. ............. 362/294
5,748,376 A * 5/1998 Lin et al. ..................... 362/268

* cited by examiner

Primary Examiner—Sandra O'Shea
Assistant Examiner—Guiyoung Lee
(74) Attorney, Agent, or Firm—Winston Hsu

(57) ABSTRACT

A heat source shielding device for a hollow integration rod of a projecting apparatus wherein the hollow integration rod has an incident light end and an outgoing light end. The heat source shielding device has a heat source shielding mask that is an integrally formed metal sheet structure used for slipping onto the incident light end of the hollow integration rod. And the heat source shielding mask consists of a first end, a second end. an end cover, a heat shielding plate, a first side plate, a second side plate, and a top plate. Heat accumulated by the heat shielding plate on the heat source shielding mask is dissipated by the use of the ventilation system in the projecting apparatus due to convection.

8 Claims, 6 Drawing Sheets

HEAT SOURCE SHIELDING DEVICE OF PROJECTING APPARATUS

BACKGROUND OF THE INVENTION

1. Field of the Invention

The present invention relates to a heat source shielding device for a hollow integration rod of a projecting apparatus.

2. Description of the Prior Art

The conventional projecting display apparatus can be a transmissive LCD, a reflective LCD, a digital micro device (hereinafter referred as DMD), or other available display components. Referring to FIG. 1, a schematic system diagram for a conventional projecting apparatus using a transmissive LCD projecting display apparatus in which an image formation device 16 is a projection lens. Such projecting apparatus consists of a reflection mirror 10, a light source 11, a first lens set 12, a hollow integration rod 13, a second lens set 14, a projecting display apparatus 15, an image formation device 16, and a display screen 17. The first lens set 12 includes at least one lens. The hollow integration rod 13 is an optical device provided with an incident light end 137 and an outgoing light end 138 to homogenize the light passing through it. The second lens set 14 includes at least one lens.

By means of the structure mentioned above, the light either directly transmitting from the light source 11 or being reflected from the reflection mirror 10 passes through the first lens set 12 and then converges on the incident light end 137 of the hollow integration rod 13. Afterward, the light being homogenized after passing through the hollow integration rod 13 passes through the second lens set 14 and reaches the projecting display apparatus 15 so that the image of the projecting display apparatus 15 is projected on the display screen 17 through the image formation device 16.

A conventional projecting display apparatus 15 shown in FIG. 2 is a DMD. The light once reaching the projecting display apparatus 15 is refracted to the image formation device 16 so as to project the image of projecting display apparatus 15 on the display screen 17.

A conventional projecting display apparatus 15 shown in FIG. 3 is the reflective LCD. The light after passing through the second lens set 14 and then reaching the projecting display apparatus 15 is reflected back to the second lens set 14 again and afterwards turns 90 degree toward the image formation device 16. Therefore the image of projecting display apparatus 15 is projected on the display screen 17.

FIG. 4 is a pictorial view of the hollow integration rod of the conventional projecting apparatus. As shown in FIG. 4, the hollow integration rod 13 consists of a first mirror 131 that is one set of two parallel mirrors with a reflecting film coated on one surface of each mirror and a second mirror 132 that is another set of two parallel mirrors with a reflecting film coated on one surface of each mirror. Thus a hollow rod is constructed with these two sets of mirrors by the adhesive 134 applied on the conjunction seams between mirrors wherein the internal surfaces of this hollow rod is constituted by the surface of every mirror coated with the reflecting film facing inward. The main function of the hollow integration rod 13 is to homogenize the light, after the light enters the incident light end 137 and reflects multiple times while passes through, emitting from the outgoing light end 138 and thereby to generate the homogenized projection picture.

At this moment the conventional projecting apparatus employs a light source of 120 Watt. The adhesive used for assembling the hollow integration rod 13 can sustain the temperature up to 120 degree centigrade while the surface temperature of hollow integration rod 13 is lower than 120 degree centigrade during the normal operation of projecting apparatus. However, along with the development of the projecting apparatuses, the light source used is increased up to approximate 150 Watt. Thus, during the normal operation of projecting apparatus, the surface temperature of hollow integration rod 13 is higher then 120 degree centigrade resulting in the collapse of the hollow integration rod due to the melting down of the adhesive.

In recent practice, in order to achieve the functional objective of homogenizing the light, only the portion of light reaching the incident light end 137 is required to transmit on the internal reflecting surfaces of the hollow integration rod 13 when the light transmits on the hollow integration rod 13. However, the rest portion of light not only is useless for achieving the functional objective but also creates the adverse effects resulted from the rest portion of light transmitting on the non-reflecting surfaces and the adhesive seams. One of the adverse effects is the melting down of the adhesive 134 due to the raise of the surface temperature of the hollow integration rod 13. This is the disadvantage of the hollow integration rod 13 of the conventional projecting apparatus.

SUMMARY OF THE INVENTION

Aiming at the disadvantage of the hollow integration rod of the conventional projecting apparatus, one of the objects of the present invention is to provide a heat source shielding device that utilizes a light reflecting metal shielding plate with the characteristic of excellent heat conductivity. The heat source shielding device is installed at an end of the hollow integration rod near the light source whereby all the light beams other than the ones transmitted into the opening at the incident light end impinge on the metal shielding plate. Furthermore, a relatively larger area for heat dissipation with better heat conductivity is utilized to conduct the heat generated by the light transmitting on the metal shielding plate. Then, a circulating air is produced by a fan in the projecting apparatus to remove the heat generated on the surface of the metal shielding plate due to convection. Thus, the surface temperature of the hollow integration rod is kept below 120 degree centigrade and consequently the adhesive, by which every mirror is adhered, is not melting down. As a result, the structural integrity of the hollow integration rod is therefore maintained.

In order to achieve the above mentioned objects, a heat source shielding device according to the invention for the hollow integration rod of the projecting apparatus is provided. The hollow integration rod consists of an incident light end and an outgoing light end while the heat source shielding device consists of a heat source shielding mask and a slip-on shell. The heat source shielding mask is an integrally formed metal sheet structure used for slipping onto the incident light end of the hollow integration rod. And the heat source shielding mask includes a first end, a second end, an end cover, a heat shielding plate, a first side plate, a second side plate, and a top plate. The slip-on shell is an integrally formed metal sheet structure with U-shape cross section used for slipping onto the outgoing light end of the hollow integration rod. And the slip-on shell includes a first end, a second end, a top plate, a side plate and a bottom plate provided with both a protruding plate near the first end for positioning and a stopper near the second end for halting the hollow integration rod.

Besides, the area of the top plate near the first end of the slip-on shell is overlapped and adhered by the heat conducting adhesive to the area of the top plate near the second end of the heat source shielding mask. Therefore, a portion of heat transferred from the heat shielding plate of the heat source shielding mask is dissipated through the slip-on shell by conduction. The rest heat accumulated in the heat shielding plate on the heat source shielding mask is yet dissipated by the ventilation system in the projecting apparatus due to convection.

BRIEF DESCRIPTION OF THE DRAWINGS

The mentioned objects, various other objects, advantages, and features of the present invention will be more fully understood from the following detailed description of the preferred aspect of the invention when considered in connection with the accompanying drawings below.

FIG. 6 is a pictorial drawing of the slip-on shell of the invention wherein FIG. 6(a) is a pictorial drawing from an aspect of front view and top view while

DETAILED DESCRIPTION OF THE INVENTION

Figure 1:
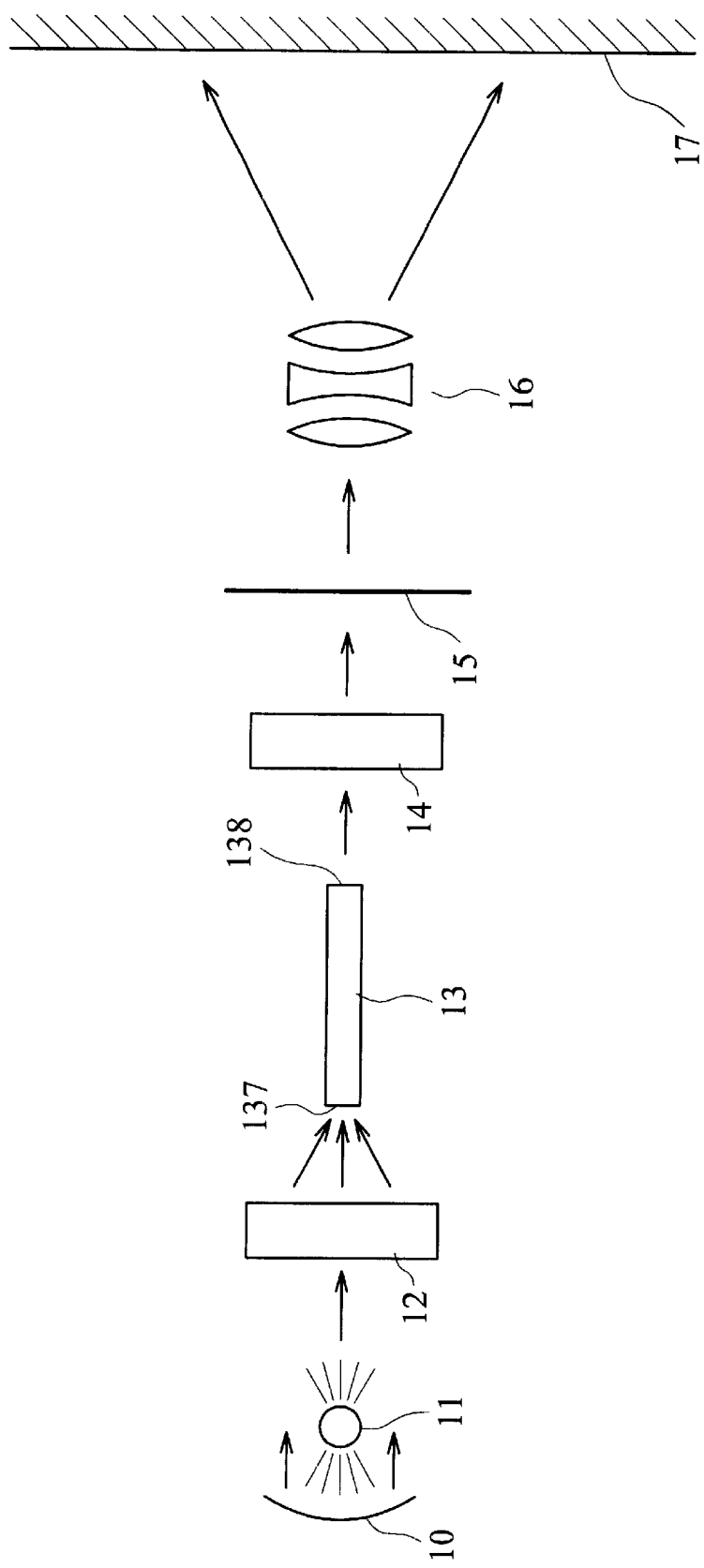
FIG. 1 is a schematic diagram of the optical system of the conventional projecting apparatus provided with a transmissive LCD.
Figure 2:
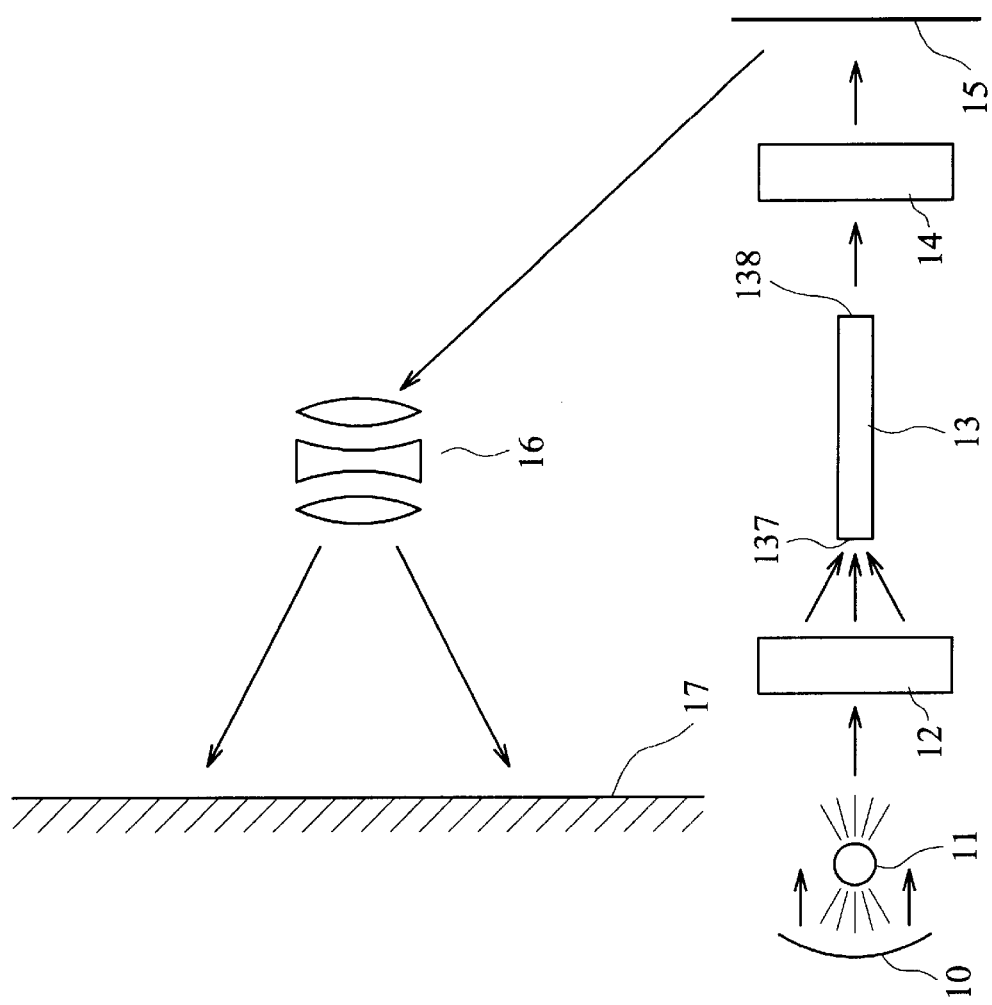
FIG. 2 is a schematic diagram of the optical system of the conventional projecting apparatus provided with a DMD.
Figure 3:
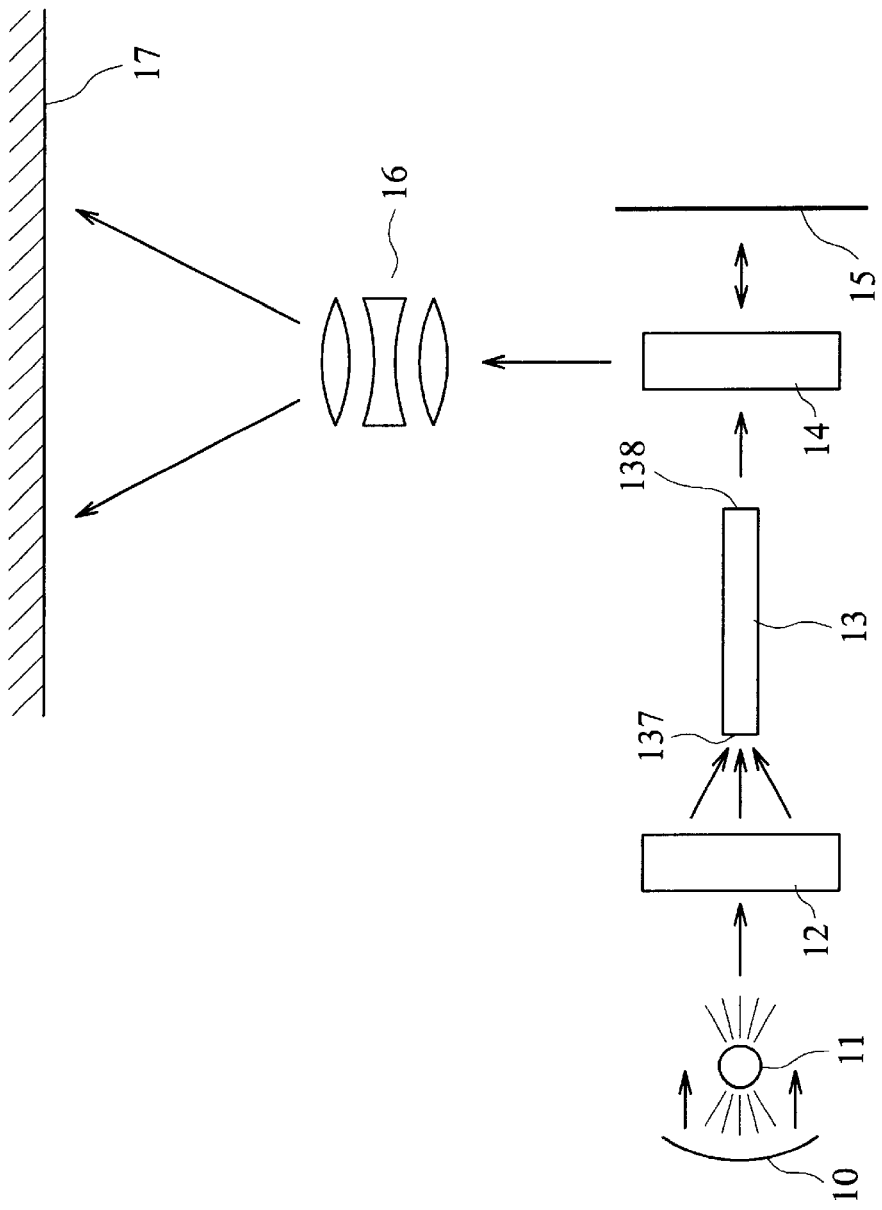
FIG. 3 is a schematic diagram of the optical system of the conventional projecting apparatus provided with the reflective LCD.
Figure 4:
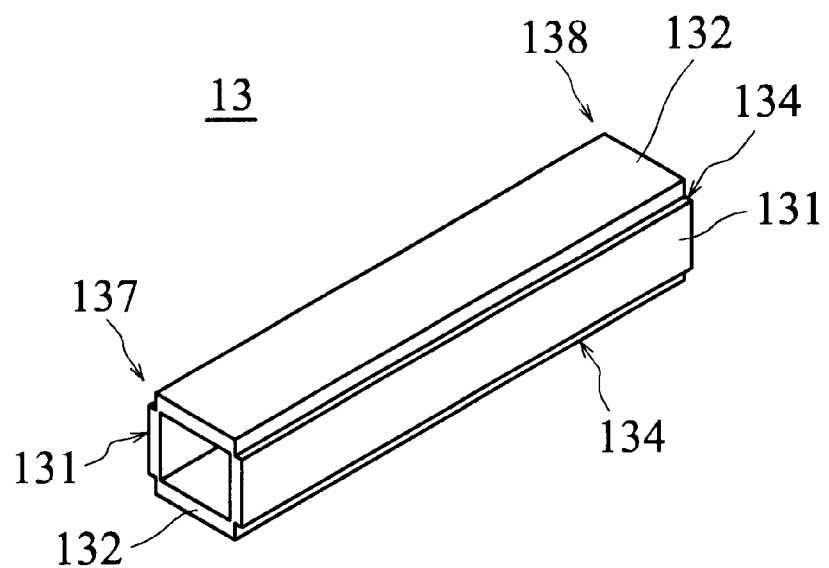
FIG. 4 is a pictorial drawing of a hollow integration rod of the conventional projecting apparatus.
Figure 5:
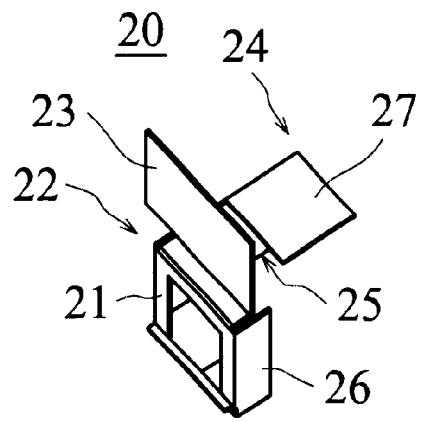
FIG. 5 is a pictorial drawing of the heat source shielding mask of the invention.
Figure 6A:
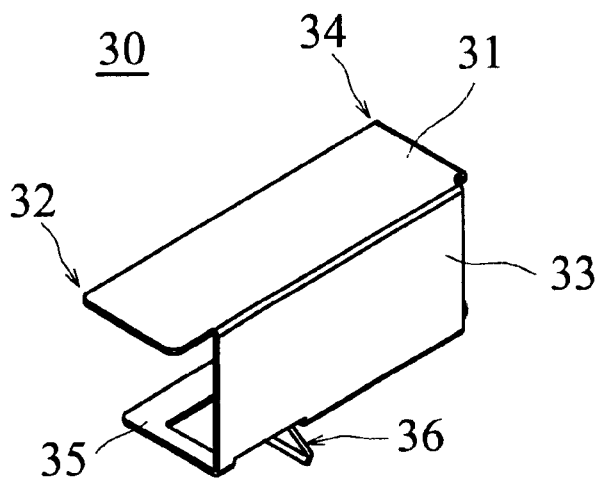
Figure 6B:
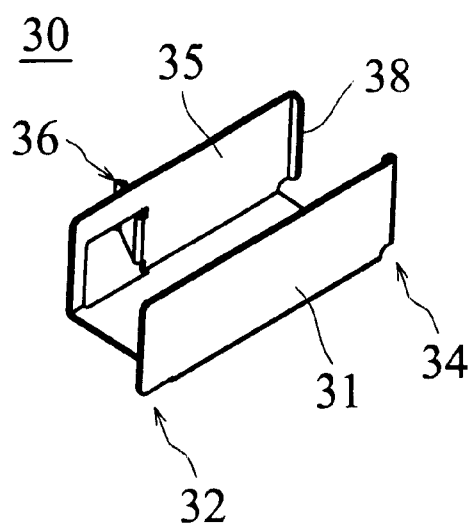
FIG. 6(b) is a pictorial drawing from an aspect of front view and bottom view.

FIG. 5 is a pictorial drawing of a heat source shielding mask of the invention. FIG. 6 is a pictorial drawing of a slip-on shell of the invention wherein FIG. 6(a) is a pictorial drawing from an aspect of front view and top view while FIG. 6(b) is a pictorial drawing from an aspect of front view and bottom view. As shown in FIG. 5 and FIG. 6, a heat source shielding device for a hollow integration rod 13 of a projecting apparatus consists of a heat source shielding mask 20 and a slip-on shell 30. The heat source shielding mask 20 is an integrally formed metal sheet structure used for slipping onto the incident light end 137 of the hollow integration rod 13. And The heat source shielding mask 20 includes a first end 22, a second end 24, an end cover 21, a heat shielding plate 23, a first side plate 25, a second side plate 26, and a top plate 27.

Likewise, the slip-on shell 30 is an integrally formed metal sheet structure with U-shaped cross section used for slipping onto the outgoing light end 138 of the hollow integration rod 13. And the slip-on shell 30 includes a first end 32, a second end 34, a top plate 31, a side plate 33 and a bottom plate 35. The bottom plate 35 is provided with both a protruding plate 36 near the first end 32 for positioning and a stopper 38 near the second end 34 for abutting against the outgoing light end 138 of the hollow integration rod 13.

In addition, the first end 32 of the top plate 31 of the slip-on shell 30 is overlapped and adhered by a heat conducting adhesive (not shown) to the second end 24 of the top plate 27 of the heat source shielding mask 20. Thus, a portion of heat transferred from the heat shielding plate 23 of the heat source shielding mask 20 is dissipated through the conduction of the slip-on shell 30. The rest heat accumulated in the heat shielding plate 23 on the heat source shielding mask 20 is dissipated by the ventilation system (not shown) in the projecting apparatus through convection.

The material used for the metal sheet structure, whether the heat source shielding mask 20 or the slip-on shell 30 of the heat source shielding device, is either stainless steel or aluminum alloy with a layer of anti-rust coating.

First step of installing the heat source shielding device is to keep the top plate 31 of the slip-on shell 30 facing upward. Then the outgoing light end 138 of the hollow integration rod is slipped into the first end 32 of the opening constituted by the top plate 31, the side plate 33 and bottom plate 35 of the slip-on shell 30. Until the outgoing light end 138 of the hollow integration rod reaches the stopper 38.

Second step is to keep the top plate 27 of the heat source shielding mask 20 facing up. Then the second end 24 of the heat source shielding mask 20 is slipped onto the incident light end 137 of the hollow integration rod 13 through the opening constituted by the first side plate 25, the second side plate 26, and the top plate 27 until the incident light end 137 of the hollow integration rod 13 reaches the end cover 21. At this moment the top plate 27 of the heat source shielding mask 20 overlaps the top plate 31 of the slip-on shell 30. Thus, the installation of the heat source shielding device on the hollow integration rod 13 is completed after these two overlapping top plates are adhered to each other at the overlapping area by a heat conducting adhesive.

The final step is to install and position the hollow integration rod 13 with the heat source shielding device at a predetermined location in the projecting apparatus with the protruding plate 36 of the bottom plate 35.

Figure 7:
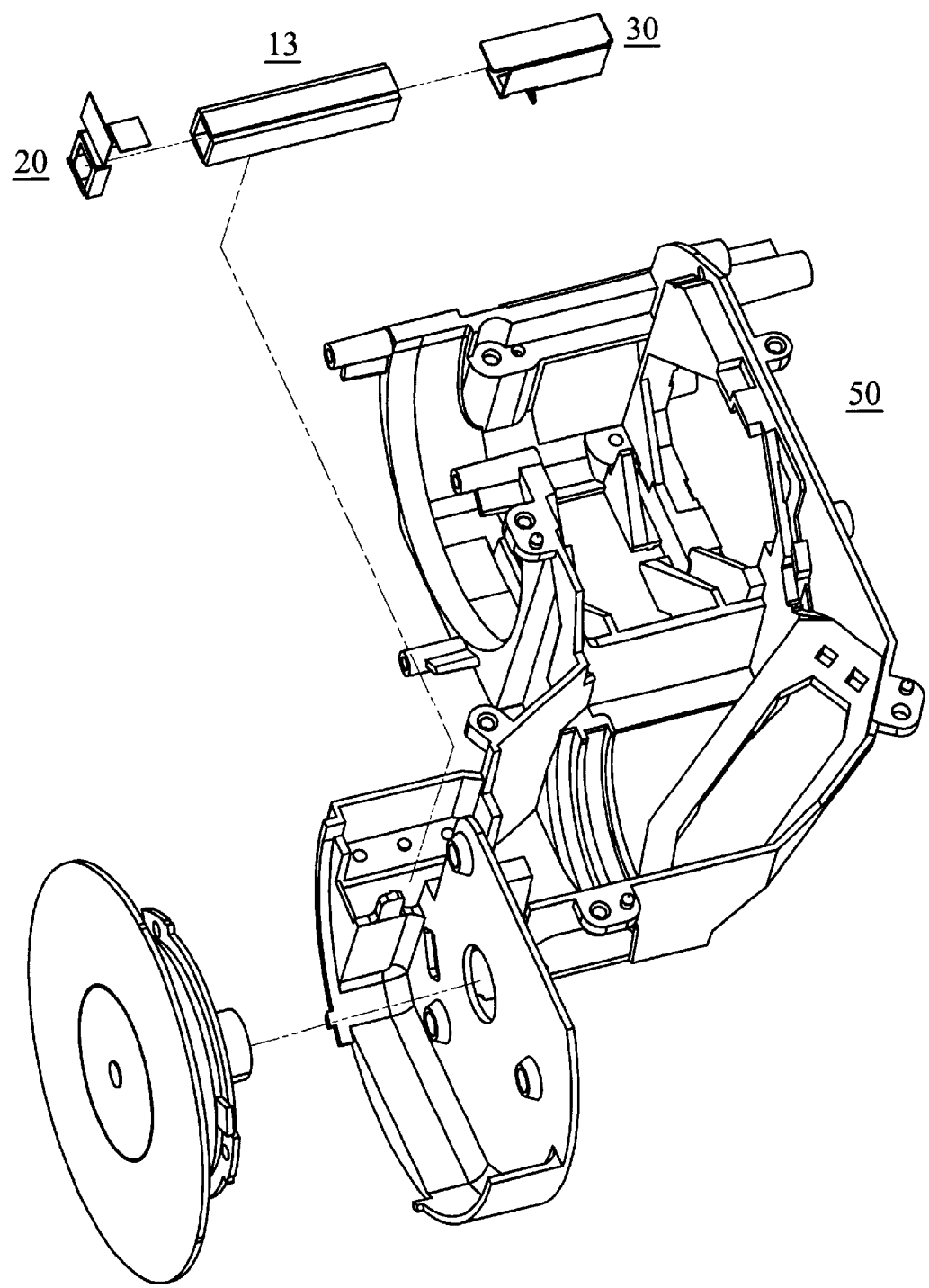
FIG. 7 shows the location of hollow integration rod installed in the projecting apparatus along with both the heat source shielding mask and the slip-on shell of the heat source shielding device.

FIG. 7 shows the location of the hollow integration rod 13 installed in the projecting apparatus along with both the heat source shielding mask 20 and the slip-on shell 30 of the heat source shielding device.

The specific aspect of the embodiments shown in the detailed description of the invention is to simply illustrate the technical contents of the present invention rather than, in all respect, to restrict the invention to such specific embodiment. Any possible alternation performed in accordance with the spirit and the following claims of the invention are therefore within the scope of the invention.

What is claimed is:

1. A heat source shielding device for a hollow integration rod of a projecting apparatus having a ventilation system, wherein said hollow integration rod has an incident light end and an outgoing light end, the incident light end has a front edge, and said heat source shielding device is installed at the front edge of said incident light end, comprising:

a heat source shielding mask that is an integrally formed metal sheet structure used for slipping onto the incident light end of the hollow integration rod, and includes a first end, a second end, an end cover, a heat shielding plate, a first side plate, a second side plate, and a top plate; and a slip-on shell that is an integrally formed metal sheet structure with U-shaped cross section used for slipping onto the outgoing light end of the hollow integration rod, and includes a first end, a second end, a top plate, a side plate and a bottom plate provided with a protruding positioning plate near said first end and a stopper near said second end for abutting against said outgoing light end of said hollow integration rod, wherein a portion, near said first end of said slip-on shell, of said top plate of said slip-on shell is overlapped and adhered by a heat conducting adhesive to a portion, near said second end of said heat source shielding mask, of said top plate of said heat source shielding mask so that a portion of heat transferred from said heat shielding plate of said heat source shielding mask is dissipated through said slip-on shell by conduction while the rest heat accumulated in said heat shielding plate on said heat source shielding mask is dissipated by the ventilation system of the projecting apparatus by convection.

2. The heat source shielding device for a hollow integration rod of a projecting apparatus of claim 1 wherein said heat source shielding mask is made of material with adequate characteristic for dissipating heat, and said material is a material selected from the group consisting of stainless steel and aluminum alloy with a layer of anti-rust coating.

3. The heat source shielding device for a hollow integration rod of a projecting apparatus of claim 1 wherein said slip-on shell is made of material with adequate characteristic for dissipating heat, and said material is a material selected from the group consisting of stainless steel and aluminum alloy with a layer of anti-rust coating.

4. A heat source shielding device for a hollow integration rod of a projecting apparatus having a ventilation system, wherein said hollow integration rod has an incident light end and an outgoing light end, the incident light end has a front edge, and said heat source shielding device is installed at the front edge of said incident light end, comprising:

a heat source shielding mask that is an integrally formed metal sheet structure used for slipping onto said incident light end of said hollow integration rod, and includes a first end, a second end, an end cover, a heat shielding plate, a first side plate, a second side plate, and a top plate, wherein the heat accumulated in said heat shielding plate of said heat source shielding mask is dissipated by the ventilation system of the projecting apparatus by convection.

5. The heat source shielding device for a hollow integration rod of a projecting apparatus of claim 4 further comprising a slip-on shell that is an integrally formed metal sheet structure with U-shaped cross section for slipping onto said outgoing light end of said hollow integration rod that includes a first end, a second end, a top plate, a side plate and a bottom plate provided with both a protruding positioning plate near said first end and a stopper near said second end for abutting against said outgoing light end of said hollow integration rod, wherein a portion, near said first end of said slip-on shell, of said top plate of said slip-on shell is overlapped and adhered by a heat conducting adhesive to a portion, near said second end of said heat source shielding mask, of said top plate of said heat source shielding mask so as to dissipate the heat transferred from said heat shielding plate of said heat source shielding mask through the conduction of said slip-on shell.

6. The heat source shielding device for a hollow integration rod of a projecting apparatus of claim 4 wherein said heat source shielding mask is made of material with adequate characteristic for dissipating heat, and said material is a material selected from the group consisting of stainless steel and aluminum alloy with a layer of anti-rust coating.

7. The heat source shielding device for a hollow integration rod of a projecting apparatus of claim 5 wherein said slip-on shell is made of material with adequate characteristic for dissipating heat, and said material is a material selected from the group consisting of stainless steel and aluminum alloy with a layer of anti-rust coating.

8. A heat source shielding device for a hollow integration rod of a projecting apparatus having a light source and a ventilation system, wherein said hollow integration rod has an incident light end and an outgoing light end, the incident light end has a front edge, and said heat source shielding device is installed at the front edge of said incident light end, comprising a heat source shielding mask that is attached to said incident light end of said hollow integration rod for shielding the front edge of incident light end of the hollow integration of the light source.

* * * * *